Patented Feb. 4, 1947

2,415,397

UNITED STATES PATENT OFFICE 2,415,397

METHOD OF PREPARING GLYOXAL SULPHATE

Enno Wolthuis, Cranford, and John C. Lawler, Westfield, N. J., assignors to General Aniline & Film Corporation, New York, N. Y., a corporation of Delaware No Drawing. Application December 6, 1944,
Serial No. 566,956

13 Claims. (Cl. 260—458)

This invention relates to a novel and improved process for preparing glyoxal sulphate.

The preparation of glyoxal sulphate has already been described, as for example, in German Patent No. 362,743. According to the process of this patent, the compound is prepared by the slow addition of fuming sulphuric acid, or oleum, to tetrachlorethane in which is suspended mercury sulphate. However, it has been found that in following this procedure, the yields obtained are only a fraction of the theoretical yields. Furthermore, the process is accompanied by various disadvantages since it is highly exothermic, and as a result, is difficult to control, and ofttimes, impossible to do so. The disadvantages of the process described in the German patent are recited in the United States Patent No. 1,999,995, which sets forth a procedure involving the reversal of the steps comprising the German process.

According to the process of this United States patent, the tetrachlorethane is added slowly to strong oleum which contains mercury sulphate, and the reaction mass is further warmed until the reaction is complete.

Although this process is designed to overcome the disadvantages of the German patent, we have found that in both processes heretofore described, there is always present the danger of overheating which results in low yields since such overheating causes the glyoxal sulphate formed to turn brown and decompose.

It is, accordingly, among the objects of our invention to provide a method which will produce glyoxal sulphate in high yields, which can be readily controlled, and which will also eliminate the hazards of the known processes, particularly the danger of overheating.

We have found that by slowly adding strong oleum, or fuming sulphuric acid, to the tetrachlorethane in the absence of a catalyst, then following this by the slow addition of a catalyst for the reaction, such as mercuric sulphate, and then permitting the reaction to proceed until it is complete, that comparatively high yields of glyoxal sulphate are obtained, that the reaction proceeds smoothly and in an easily controllable manner, and that the possibility of overheating with the attendant decomposition of glyoxal sulphate is eliminated.

We have also found that instead of adding the oleum to the tetrachlorethane, the sequence of charging can be reversed. In other words, we have discovered that the sequence of charging these reagents is immaterial in our process as long as the catalyst is not present in either, but is added after the two reagents have been mixed.

We have further found that during the mixing of the reagents in the absence of a catalyst, the reaction to form glyoxal sulfate proceeds partially, with generation of only a small amount of heat which is readily controlled. Upon addition of the catalyst the reaction is then completed which further reaction is easily controlled. As a result, the violent reactions which accompany the prior art procedures do not occur in our process.

We have also discovered that if the reaction mass is diluted with sulphuric acid prior to its filtration that not only is excessive fuming of the reaction mass during filtration substantially decreased, but that also the yield of the glyoxal sulphate is increased from 4–5%. Similar results are obtained if instead of dilution with sulphuric acid before filtration, the reaction mixture is simply drowned in water, preferably ice water. The glyoxal sulphate separates and can be filtered off. In general, the temperature of the water used is preferably below 25° C.

By our process we have succeeded in readily obtaining yields ranging from approximately 70–77%.

The following examples are given by way of illustration of the preferred manner of carrying out our process and not by way of limitation.

Example 1

Heat 100 grams of tetrachlorethane to 60° C. and maintain the temperature between a range of 60–65° C., while slowly adding over a period of about two hours 400 grams of 65% oleum. Then add in small portions 2.4 grams of mercuric sulphate over a period of about two hours. After the addition of the mercuric sulphate, maintain the temperature at a range of 60–65° C. for about five hours longer.

Cool the reaction mixture to about 5° C. and add slowly to the crystalline magma formed 275 grams of 96% sulphuric acid over a period of about one hour so that the temperature does not rise above 10° C. After all the sulphuric acid is added, cool again to about 5° C., filter the crystalline magma, and wash the filter cake with a 96% sulphuric acid solution which has been previously cooled to about 5–10° C.

When most of the sulphuric acid has been removed, sludge the filter cake with stirring into ice water which still contains ice. The addition of the filter cake to the ice water is made in small portions to avoid decomposition. The slurry is again filtered and washed with ice water. The crystals may then be dried at room temperature in air or in a vacuum. White crystals of glyoxal sulphate are obtained which are of high purity in yields ranging from 70–77% of the theoretical yield.

The glyoxal sulphate may then readily be hydrolyzed to glyoxal by adding it in small portions to water heated to a temperature of 90–95° C. The acid formed through the hydrolysis may be neutralized by any suitable alkali, such as lime, calcium carbonate, or barium hydroxide. The insoluble salts of these alkaline earth metals, which are formed, are readily removed from the solution, and the solution of the glyoxal may then be evaporated to any desired concentration.

*Example 2*

Heat 400 grams of 65% oleum to 60° C. and maintain the temperature between a range of 60–65° C. while slowly adding over a period of about two hours 100 grams of tetrachlorethane. Then proceed with the addition of the catalyst and the other operations as in Example 1.

*Example 3*

100 grams of tetrachlorethane and 400 grams of 65% oleum are mixed together at room temperature and the mixture heated to about 50° C. There is then added in small portions one-half gram of mercuric sulphate over a period of about two hours. After the addition of mercuric sulphate, the temperature is maintained at a range of 60–65° C. for about five hours longer. The procedure next followed is the same as in Example 1.

*Example 4*

Heat 100 grams of tetrachlorethane to 60° C. and maintain the temperature between a range of 60–65° C. while slowly adding over a period of about two hours 400 grams of 65% oleum. Then add in small portions 2.4 grams of mercuric sulphate over a period of about two hours. After the addition of the mercuric sulphate, maintain the temperature at a range of about 60–65° C. for about five hours longer.

The mixture is then cooled to about 5° C. and drowned in ice water at 0° C., stirred at this temperature for about thirty minutes, and filtered. The white crystalline product is washed with ice water and sucked dry. White crystals of glyoxal sulphate of high purity are obtained in yields ranging from approximately 70–77% of the theoretical yield.

While the temperature, time, and concentration may be varied in our process, it has been found that temperatures of 50–75° C. are operative although the range between 60–65° C. produces the largest yields. A temperature of reaction higher than 65° C. gave lower yields. A longer time of reaction than five hours after the catalyst is added did not change the yields appreciably. Likewise, longer periods of time for the addition of the reagents gave no appreciable change. The weight ratio of oleum to tetrachlorethane may be varied within 3 to 1 to 5 to 1, but it was found that optimum yields were obtained at ratios of 4 to 1. A ratio of 5 to 1 increased the yield only slightly.

With respect to the catalyst, it was found that by adding it in small quantities the heat of reaction can be readily controlled, and that danger of overheating and attendant decomposition of glyoxal sulphate is eliminated. Besides mercuric sulphate as a catalyst, mercurous sulphate, mercuric oxide, copper sulphate, and other heavy metal salts have been found suitable. The amount of the catalyst may vary within desired limits. We have found that as little as .05 part of catalyst may be used per hundred parts of tetrachlorethane. Amounts as high as 10 parts or more per hundred parts of tetrachlorethane may be used, if desired, but larger amounts yield no particular advantage. While it is preferred to use 65% oleum, we may use lower concentrations, since oleum of a concentration as low as 25% $SO_3$ has also been found suitable, although the yields obtained are not as large.

The advantages of applicants' process are readily seen when compared with the following:

When 65% oleum is added to tetrachlorethane there is only a small amount of heat evolved and even when holding the temperature at 60–65° C. for about five hours by external heating, only about 11% of glyoxal sulphate is formed. When a catalyst, such as heavy metal salt, as for example, mercuric sulphate, is suspended in tetrachlorethane prior to the addition of the oleum according to the practice of the German patent, the reaction takes place with great generation of heat, and the yield obtained has been found to be about 32% of the theoretical. (See the article by Paul Ruggli and Ernst Henzi, "Uber die Gewinnung von Imadazol-Losungen, etc.," Helv. Chem. Acta, vol. 12 (1929), page 363, an abstract of which appears in Chemical Abstracts, vol. 24, part 1 (1930), page 116). When the catalyst was added simultaneously with the oleum, the yield was only 61%.

On the other hand, when proceeding according to our process, namely, adding the oleum to the tetrachlorethane or vice versa in the absence of a catalyst and then adding the catalyst slowly to the mixture of oleum and tetrachlorethane, not only does the reaction proceed smoothly and danger of overheating eliminated, but a surprising increase in yield is obtained, as is evidenced by our yields of approximately 70–77% of the theoretical. Moreover, we have found that it is possible, due to the elimination of overheating, to carry out the reaction in large batches in the plant.

We claim:

1. In the method for preparing glyoxal sulphate, which comprises reacting tetrachlorethane and oleum in the presence of a catalyst for the reaction, the step which comprises slowly adding the catalyst to a mixture of oleum of over 25% and tetrachlorethane, the temperature of the reaction being maintained at about 50–75° C.

2. In the method for preparing glyoxal sulphate, which comprises reacting tetrachlorethane and oleum in the presence of a catalyst for the reaction, the steps which comprise mixing oleum of over 25% and tetrachlorethane, subsequently slowly adding the catalyst to the mixture, and then diluting the reaction mixture and maintaining the temperature of the mixture at about 50–75° C. with a sulphuric acid solution.

3. In the method for preparing glyoxal sulphate, which comprises reacting tetrachlorethane and oleum in the presence of a catalyst for the reaction, the steps which comprise mixing oleum of over 25% and tetrachlorethane, subsequently slowly adding the catalyst to the mixture, and then diluting the reaction mixture and maintaining the temperature of the mixture at about 50–75° C. in water.

4. In the method for preparing glyoxal sulphate, which comprises reacting tetrachlorethane and oleum in the presence of a catalyst for the reaction, the steps which comprise mixing oleum of over 25% and tetrachlorethane, subsequently slowly adding the catalyst to the mixture, and then diluting the reaction mixture and maintaining the temperature of the mixture at about 50–75° C. in water at a temperature below about 25° C.

5. A process as in claim 1, in which the concentration of the oleum is from 50–65%.

6. A process as in claim 2, in which the concentration of the oleum is from 50–65% and the concentration of the sulphuric acid solution about 96%.

7. In the method for preparing glyoxal sulphate, which comprises reacting tetrachlorethane and oleum in the presence of a catalyst for the reaction, the steps which comprise slowly adding oleum of over 25% to tetrachlorethane, and subsequently slowly adding mercuric sulphate as a catalyst to the mixture and maintaining the reaction temperature at about 50–75° C. until the reaction is complete.

8. In the method for preparing glyoxal sulphate, which comprises reacting tetrachlorethane and oleum in the presence of a catalyst for the reaction, the steps which comprise adding 65% of oleum to the tetrachlorethane in about two hours at a temperature of about 60–65° C., subsequently adding mercuric sulphate as a catalyst over a period of about two hours and maintaining the temperature of the mixture at about 60–65° C. for about five hours.

9. A process as in claim 8, in which the reaction mixture formed is cooled and a sulphuric acid solution then added thereto while maintaining the temperature so as not to rise above approximately 10° C.

10. A process as in claim 8 in which the reaction mixture formed is diluted in water at a temperature below 25° C.

11. In the preparation of glyoxal sulphate, the steps which comprise slowly adding about 400 parts of 65% oleum to about 100 parts of tetrachlorethane while the temperature of the mass is maintained at 60–65° C., slowly adding at least 0.05 part of mercuric sulphate to the reaction mass at a temperature of 60–65° C., subsequently maintaining this temperature until the reaction is complete, cooling the reaction mass, adding slowly about 96% sulphuric acid solution thereto, and then separating the glyoxal sulphate from the reaction mass.

12. In the process of preparing glyoxal sulfate which comprises reacting tetrachlorethane and oleum in the presence of a catalyst for the reaction, the steps which comprise slowly adding the catalyst to a mixture of oleum of over 25% and tetrachlorethane, the temperature of the reaction mixture being maintained at about 50–75° C. until the reaction is complete, then slowly adding a sulfuric acid solution to the reaction mass, and then filtering the reaction mass.

13. In the process of preparing glyoxal sulfate which comprises reacting tetrachlorethane and oleum in the presence of a catalyst for the reaction, the steps which comprise slowly adding the catalyst to a mixture of oleum of over 25% and tetrachlorethane, the temperature of the reaction mixture being maintained at about 50–75° C. until the reaction is complete, then diluting the reaction mass in water, and then filtering the reaction mass.

ENNO WOLTHUIS.
JOHN C. LAWLER.

REFERENCES CITED

The following references are of record in the file of this patent:

UNITED STATES PATENTS

| Number | Name | Date |
|---|---|---|
| 1,999,995 | Perkins | Apr. 30, 1935 |

FOREIGN PATENTS

| Number | Country | Date |
|---|---|---|
| 362,743 | German | Nov. 2, 1922 |